United States Patent [19]

Stebbins

[11] Patent Number: 4,843,627
[45] Date of Patent: Jun. 27, 1989

[54] CIRCUIT AND METHOD FOR PROVIDING A LIGHT ENERGY RESPONSE TO AN EVENT IN REAL TIME

[76] Inventor: Russell T. Stebbins, 112 Ferne Ave., Palo Alto, Calif. 94306

[21] Appl. No.: 893,483

[22] Filed: Aug. 5, 1986

[51] Int. Cl.$^4$ .............................................. H03G 3/20
[52] U.S. Cl. ............................. 381/110; 340/815.11; 340/815.17; 84/464 R
[58] Field of Search ............ 340/767, 793, 69, 815.11, 340/815.17; 381/56, 57, 124, 110; 84/464 R

[56] References Cited

U.S. PATENT DOCUMENTS

| | | | |
|---|---|---|---|
| 3,886,403 | 5/1975 | Owaki et al. | 340/767 |
| 4,305,319 | 12/1981 | Linn | 84/1.01 |
| 4,353,008 | 10/1982 | Dorfman | 84/464 R |
| 4,357,594 | 11/1982 | Ehrlich et al. | 340/69 |
| 4,440,059 | 4/1984 | Hunter | 84/464 R |

Primary Examiner—Forester W. Isen
Attorney, Agent, or Firm—Limbach, Limbach & Sutton

[57] ABSTRACT

An apparatus and method are provided for illuminating a light source in real time response to an event of changing magnitude. A pulsed electrical signal is generated which has a pulse repetition frequency corresponding to the magnitude of the event. The pulsed electrical signal is then utilized to control the power provided to the light source such that the intensity of light energy provided by the light source varies in real time with changes in the magnitude of the event.

38 Claims, 10 Drawing Sheets

POINT A
DIMMER/BACKGROUND INTENSITY

FIG.11.

POINT A
BLINK AND FLASH

CIRCUIT AND METHOD FOR PROVIDING A LIGHT ENERGY RESPONSE TO AN EVENT IN REAL TIME

BACKGROUND OF THE INVENTION

This invention relates to light converters and, in particular, to a circuit and method for providing a visible light energy response to an event in real time.

Devices which convert sound waves into light energy using an incandescent light source have been in use for some time. However, in such incandescent devices, there is a substantial inherent time delay between the occurrence of the sound stimulus and the appearance of a corresponding light response. This is due, in part, to the fact that incandescent filaments cannot respond quickly enough to the sudden changes in input voltage required to provide real time response to a rapidly changing sound input. A typical incandescent light filament has an inherent on-time delay, or "heat-up time", of about 200 milliseconds. Similarly, once the power to an incandescent light is turned off, another 200 milliseconds is required for the filament to cool down.

Use of other types of light sources with faster response times, such as neon tubes, has been inhibited by the large input voltage and 60 cycle frequency required to drive such sources sufficiently to achieve even ionization of the gas over the entire length of the tube. To generate the high voltage typically required to drive light sources of this type requires a large transformer. Because of the iron core and the large diameter of the transformer winding and hence, its mass, transformers of the size required to develop the high voltage necessary in these applications also have high inductance, intercapacitance and low coupling efficiency. Therefore, these transformers cannot generate the high frequency response required to provide real time sound-to-light conversion.

It has been found that when sound or music is accompanied by visible light in real time, the perception of the sound or music is greatly enhanced by the presence of a simultaneous corresponding light stimulation.

Figures 1, 2, 3, 4:
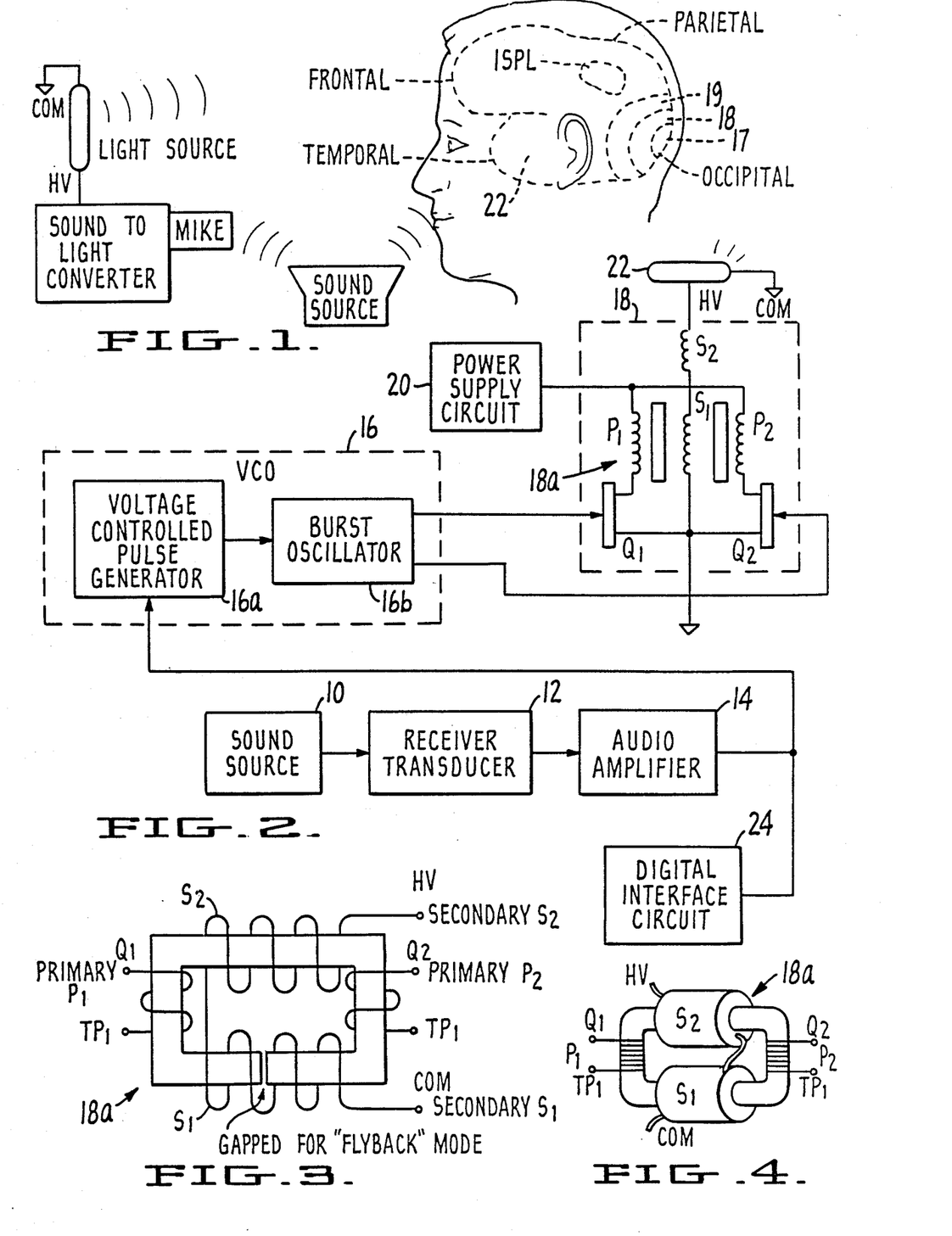
FIG. 1 is a schematic illustration of a human brain showing Broodmann's topological mapping for visual and auditory processing and simultaneous stimulation of the ISPL by visual and auditory systems.
FIG. 2 is a schematic block diagram illustrating the basic concept of responding to an event with a real time light response according to the present invention.
FIG. 3 is a schematic drawing illustrating a push-pull power transformer utilized in conjunction with the present invention.
FIG. 4 is a mechanical drawing illustrating the push-pull power transformer shown in FIG. 3.

FIG. 1 shows a topological mapping of the human brain according to Broodmann (see Broodmann, 1852). The neural systems associated with sound-to-light stimuli are as follows: areas 17, 18 and 19 are the primary, secondary and tertiary systems of visual processing, respectively, and area 22 is the primary system of auditory processing. Broodmann, however, failed to detect functional capacity in the inferior-superior parietal lobe (ISPL). Therefore, the ISPL is not numerically differentiated in Broodmann's mapping.

Conventional wisdom holds that the ISPL is involved with abstract cross-modal interfacing of discrete sensory modalities. (See Pribram: *Languaqe and the Brain;* 1972). Stimulation of the ISPL generates an electrochemical response within the brain which spreads across the entire neocortical surface, thereby creating a meta-sensory state of consciousness. Due to the differences in the time element associated with various external sources of stimuli, e.g., the different speeds of sound and light, the ISPL is activated upon the receipt of messages generated by lower order collateral systems and redundant circuits which merely attempt to simulate simultaneity. However, the simultaneous firing of the neural systems for both auditory processing and visual processing is a necessary precondition for the ISPL system to fire cleanly, thus bypassing redundant and collateral systems. In other words, a more enriching experience is provided if a sound performance and an accompanying light display are perfectly synchronized.

However, a synchronized sound/light performance is not the only situation in which a real time light response to an event is desirable. For example, as stated above, an incandescent light bulb requires about 200 milliseconds to heat up to full brightness. For two cars travelling in the same direction at 60 miles per hour, this incandescent heat-up time correlates to about 17.6 feet that the second car will travel between the time that the driver of the first car applies the brake and the time that the driver of the second car sees the brake light of the first car. If the brake lights of the first car went on at the same time that its brake pedal was applied, the second car could begin braking 17.6 feet sooner.

Moreover, if the brake light were a tube of rare gas, such as neon, the light would be brighter, more efficient and more visible in bad weather. According to Samuel C. Miller, "Neon Techniques and Handling," 1977, incandescent light bulbs operate at about 8% efficiency, whereas neon is about 15% efficient in red. This means that a neon brake light would have almost 50% more light output than the conventional incandescent brake light for the same power applied. Miller also states, in the same source, that neon radiates light energy at 6000 Angstroms visible red wavelength. This means that it can be seen at greater distances through fog and bad weather by about 30%, or about 1.3 times further than an incandescent source which radiates in the 4500 Ansgstroms range.

SUMMARY

It is an object of the present invention to provide an apparatus which provides a light energy response to an event in real time.

It is a further object of the present invention to provide simultaneous stimulation of the visual and auditory centers of the human brain using sound as a source for generating corresponding visible light in real time for the purpose of enhancing sound or music.

It is a further object of the present invention to provide visible light in real time response to a digital command or a switch closure, such as the application of a brake pedal in an automobile.

These and other objects of the present invention are accomplished, in general, by providing a method and apparatus whereby a real time light energy response is generated which corresponds to an event of changing magnitude. The apparatus comprises a light source, a power supply connected to the light source and a pulse generation circuit which monitors the magnitude of the event and generates a pulsed electrical signal having a pulse repetition frequency which varies in correspondence to the magnitude of the event. The pulsed electrical signal controls the power provided to the light source such that the intensity of light energy provided by the light source varies in real time with changes in the magnitude of the event.

For example, if the light source is a vehicle brake light and the event is the application by the vehicle's driver of the brake pedal, then when the brake pedal is applied, the pulse repetition frequency of the pulsed electrical signal is at a maximum and continuous power is provided to the brake light. When the driver's foot is removed from the brake pedal, the pulse repetition frequency of the pulsed signal is at a minimum and no power is provided to the brake light.

According to another application of the present invention, a sound-to-light converter is provided which converts a sound signal to visible light energy in real time. This sound-to-light converter includes a light source, a power supply for illuminating the light source, a pulse generator which monitors the sound signal and generates a pulsed electrical signal which has a pulse repetition frequency which varies in correspondence to the magnitude of the event, and a power driver connected between the power supply and the light source, the power driver being responsive to the pulsed electrical signal to control the power provided to the light source such that the intensity of light energy provided by the light source varies in real time with changes in the amplitude of the sound signal.

As described in detail below, the concept of the present invention can be implemented in a number of different embodiments to accommodate a range of power supplies and a variety of sound sources. Additional features may be added to the basic apparatus to provide, for example, dimming, blink and flash, and animation capability.

DETAILED DESCRIPTION OF THE PREFERRED EMBODIMENT

The present invention is directed to the concept of providing a light energy response to an event in real time. While this concept is described below primarily in the context of a real time sound-to-light converter, it should be understood that the invention is not limited to that embodiment.

FIG. 2 illustrates the basic elements of a real time sound-to-light converter according to the present invention. As shown in FIG. 2, a sound source 10 provides sound waves to a receiver transducer 12 which converts the sound waves into an electrical signal which corresponds to the amplitude of the sound signal. The output of transducer 12 is provided to audio amplifier 14. The output of audio amplifier 14 is provided to voltage controlled oscillator (VCO) 16 which includes voltage controlled pulse generator 16a and burst oscillator 16b. VCO 16 provides a pair of high frequency voltage bursts to power transistors $Q_1$ and $Q_2$ of power drive circuit 18, the duty cycle of the alternating bursts corresponding to the amplitude of the sound signal. Power supply circuit 20 provides a voltage and current source for primary windings $P_1$ and $P_2$ of transformer 18a which is included in power drive circuit 18. Secondary windings $S_1$ and $S_2$ of transformer 18a provide the output power required to drive light source 22 in real time. Thus, since the duty cycle of the alternating bursts provided to the secondary windings of transformer 18a corresponds to the amplitude of the sound signal, transformer 18a applies to light source 22 an output voltage HV the duty cycle of which is a percentage of the power available from power supply circuit 20, the percentage being directly related to the sound signal amplitude.

FIG. 2 also shows digital interface circuit 24 which can provide an alternate digital signal to VCO 16, as will be described in greater detail hereinbelow.

FIGS. 3 and 4 show a preferred embodiment of transformer 18a. The power to drive light source 22 (for example, to ionize the gas in a neon tube) is derived from the secondary winding of transformer 18a. As shown in FIGS. 3 and 4, the secondary winding of transformer 18a is wound uniquely in that it is divided into two separate windings, $S_1$ and $S_2$, each containing one-half the required number of turns. Windings $S_1$ and $S_2$ are electrically tied in series but magnetically placed in parallel on the core of transformer 18a, thus reducing its overall capacitance and increasing its frequency response.

Figure 5:
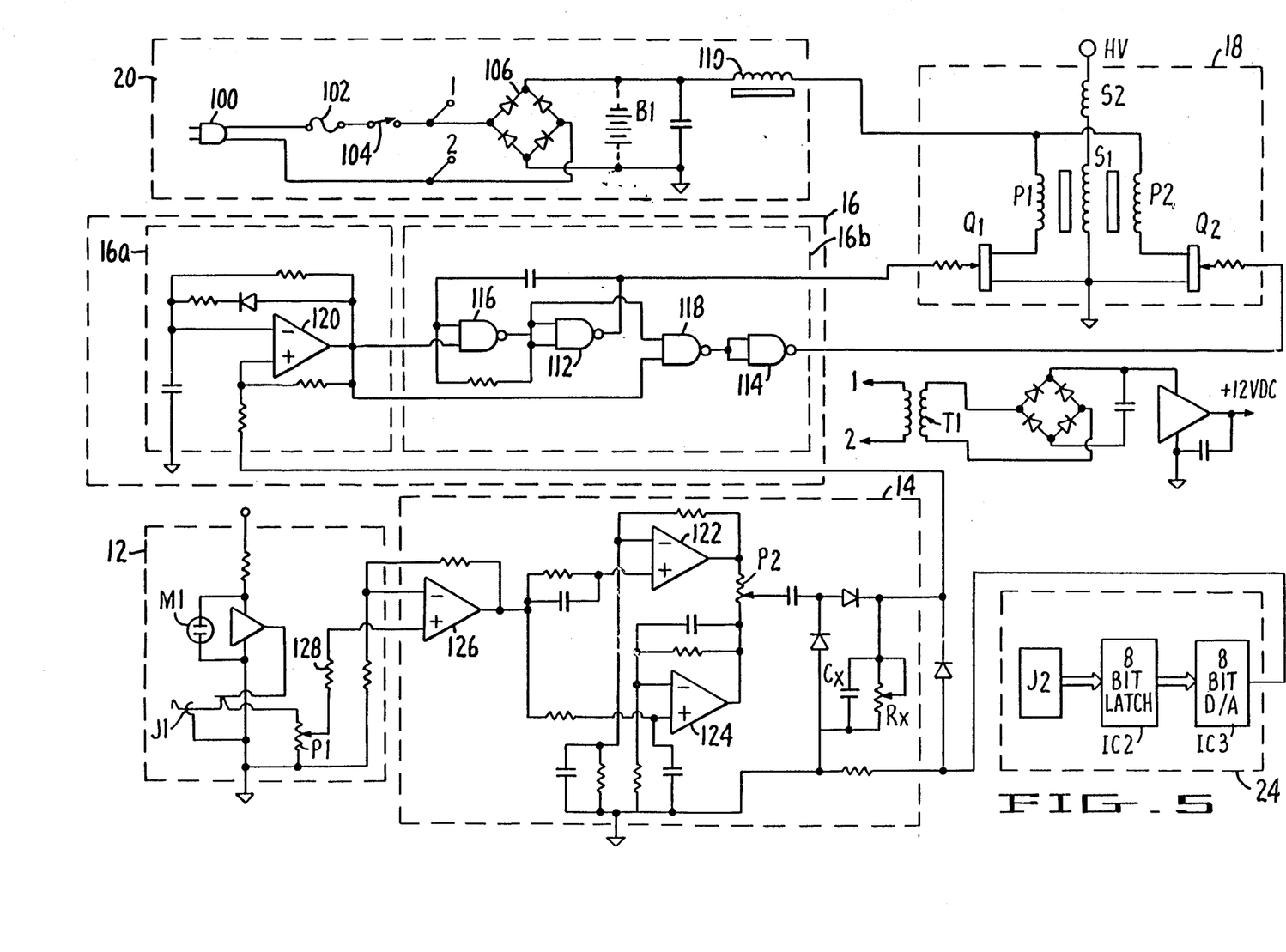
FIG. 5 is a schematic diagram illustrating a sound-to-light converter circuit according to the present invention which utilizes a 120 VAC power supply.

One embodiment of a sound-to-light converter circuit according to the present invention is shown in FIG. 5.

In the FIG. 5 embodiment, power supply circuit 20 comprises incoming 120 volt AC power source 100 which is fused through fu and switched on and off by switch 104. The 120 V power source is rectified by bridge 106, filtered by capacitor 108 and provided through inductor 110 to input node TP1 of primary windings $P_1$ and $P_2$ of transformer 18a.

As shown in FIG. 5, since semiconductor components typically require a supply voltage of 2–12 VDC, Points 1 and 2 of power supply circuit 20 are connected to the primary winding of low voltage transformer T1 and its associated circuitry which serves to step down the 120 VAC power source to provide a rectified and regulated 12 VDC voltage to the remaining components of the system.

Power transistors $Q_1$ and $Q_2$ of transformer 18a operate as a push/pull stage. Each power transistor $Q_1$, $Q_2$ is "on" and conducts signal current for one-half of each cycle of the output of transformer 18a, while during the other half-cycle it is "off" or nonconducting. In its "on" state, transistor $Q_1$ sinks current through and drops the voltage across transformer primary $P_1$ causing a proportional current to flow through and voltage across secondaries $S_1$ 1 and $S_2$. In the 120 VAC embodiment illustrated in FIG. 5, there is a 50-1 turns ratio between secondary windings $S_1$ and $S_2$ on the one hand and primary $P_1$ (and $P_2$) on the other hand. This means that the primary voltage times 50 is an approximation of what the secondary, or output voltage HV will be unloaded. However, inductance causes the primary voltage to be about twice the source voltage. Therefore, in the embodiment illustrated in FIG. 5, the primary voltage is 150 volts×2, or 300 volts. Thus, the secondary output voltage HV will be about 15 Kv unloaded. The secondary current will be a function of primary current, in this case, about 150 watts. Therefore, the secondary current will be about 0.010 amps., the primary current being about 0.5 amps.

The actual secondary voltage and current will ultimately be determined by the characteristics of light source 22 (e.g., by the properties of the rare gas or gases that are contained in the display tube, by the diameter of the tube, and by the length of the tube).

At the end of a power transistor $Q_1$ "on" cycle, transistor $Q_1$ is switched off and transistor $Q_2$ is switched "on" by the oscillation of VCO 16 output. The same on-cycle process as described above is then repeated with primary $P_2$ and transistor $Q_2$.

As shown in FIG. 5, transistors $Q_1$ and $Q_2$ derive their gate current drive input from VCO 16. More specifically, transistors $Q_1$ and $Q_2$ derive their drive input from NAND gates 112 and 114, respectively, which, in conjunction with NAND gates 116 and 118 and the associated illustrated circuit elements, comprise burst oscillator 16b. NAND gates 112 and 114 perform the oscillator function, while NAND gates 116 and 118 function as the enabling components of the burst function.

Figure 6:
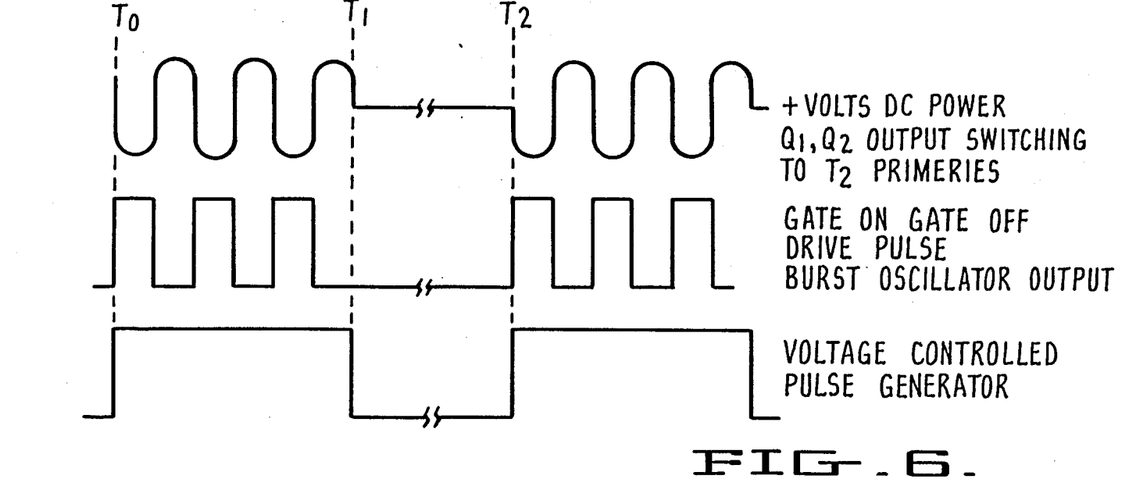
FIG. 6 is a timing diagram illustrating the relationships of the outputs of the voltage controlled pulse generator, the burst oscillator and the power drive circuit of a real time sound-to-light converter according to the present invention.

As shown in FIG. 5, the burst rate of burst oscillator 16b is a function of the output pulse repetition frequency of voltage controlled pulse generator 16a. As shown in FIGS. 5 and 6, a high output of voltage controlled pulse generator 16a enables both NAND gates 116 and 118 of burst oscillator 16b. A low output of voltage controlled pulse generator 16a disables burst oscillator 16b at the same reference points. The output pulse repetition frequency of voltage controlled pulse generator 16a is a function of the voltage present at its positive input, as shown in FIGS. 5, 6 and 7.

Figure 19:
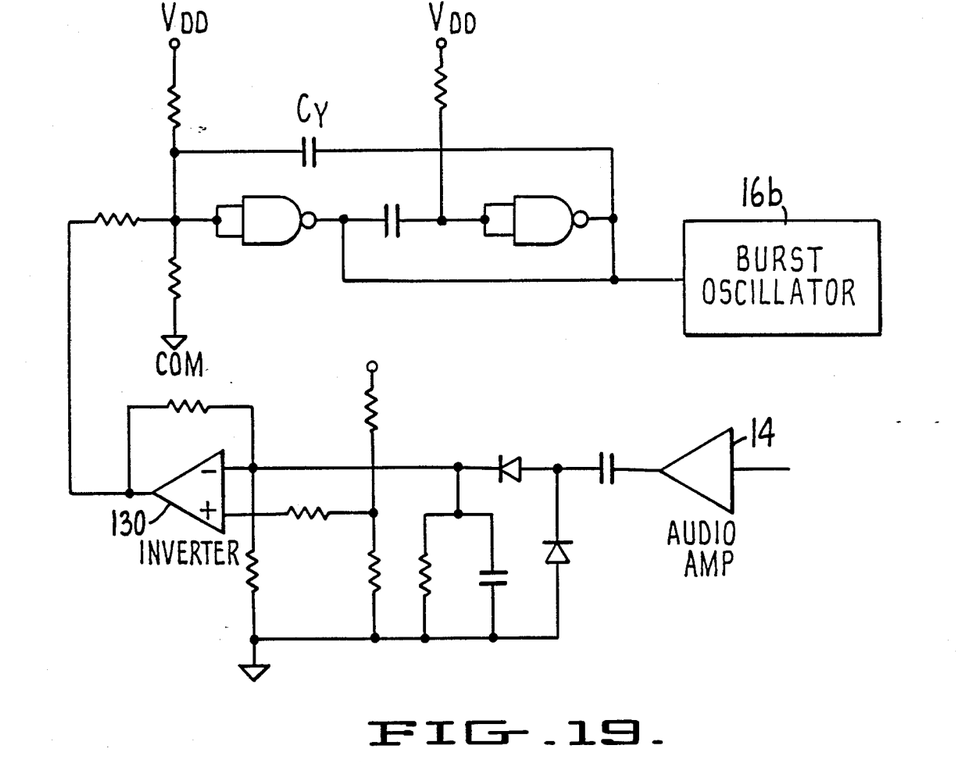
FIG. 19 is a schematic diagram illustrating a pulse width modulator circuit which may be substituted as an alternative for the voltage controlled pulse generator circuit shown in FIG. 5.

In an alternative embodiment, the voltage controlled pulse generator 16a shown in the FIG. 5 embodiment replaced by a pulse width modulator of the type shown in FIG. 19. In this case, the greater the amplitude of the received sound wave, the lower the voltage out of invertor 130 and, thus, the longer it will take for capacitor $C_y$ to charge positive. Conversely, the lower the amplitude of the received sound wave, the higher the voltage out of invertor 130 and the less time it will take for capacitor $C_y$ to charge positive.

Referring back to FIG. 5, the positive input for voltage controlled pulse generator 16a is provided by audio amplifier 14. The negative-going portion of the audio sine wave, or decay as it is called, is controlled by capacitor $C_x$ and resistor $R_x$ of audio amplifier 14. If $R_x$ is adjustable, as shown in FIG. 5, then the decay rate may be adjusted from following the audio sine wave to following the envelope of the sine wave modulation. Or, the decay rate may be stated;, i.e., either a fast or slow decay rate.

Figure 7:
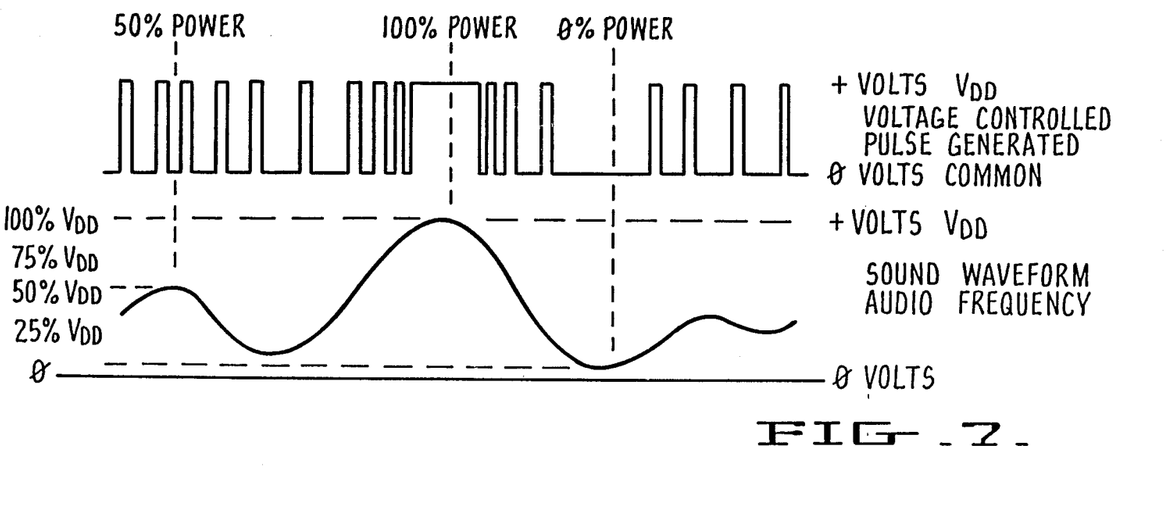
FIG. 7 is a timing diagram illustrating the relationship between the amplitude of a sound wave and the output of the voltage controlled pulse generator, equating to power output to a light source according to the present invention.

As shown in FIGS. 5, 6 and 7, the positive input of op-amp 120 of voltage controlled pulse generator 16a is provided by the outputs from amplifier and active filters 122 and 124 of audio amplifier 14. Op-amps 122 and 124, together with amplifier 126 and the related illustrated components, form audio amplifier 14 with high and low pass active filters.

The output of amplifiers 122 and 124 is a function of the output of preamplifier 126. As illustrated, preamp 126 comprises a wide band audio frequency amplifier. The output voltage of pre-amp 126 is a function of the current provided to its positive input through resistor 128. The current through resistor 128 is a function of the voltage amplitude set by wiper P1 which functions as a gain control or sensitivity control for audio amplifier 126. Thus, since the amplitude of the sound wave detected by receiver transducer 12 determines the power output HV to light source 22, wiper P1 functions as a gain and/or sensitivity control for the sound-to-light converter.

In like manner, wiper $P_2$ functions as a frequency response control.

Thus, as described above, the output pulse repetition frequency of voltage controlled pulse generator 16, may be controlled by a particular frequency audio range such as base, mid-frequency audio range, and/or high frequency audio range (treble). The amplitude of the audio sound wave provided by sound source 10 modulates the input to voltage controlled pulse generator 16a, causing the output pulse repetition frequency of voltage controlled pulse generator 16a to be modulated proportional to the output of audio amplifier 14, as illustrated in FIGS. 6 and 7. In the illustrated embodiment, one pulse from pulse generator 16a allows at least three pulses from burst oscillator 16b and, thus, results in at least three high voltage pulses being provided to light source 22. In the case of gas tubes such as neon, this is sufficient to ionize all the gas in the tube. The "off-time" of voltage controlled pulse generator 16a determines the actual light-energy output of light source 22, which is inversely proportional to the off time. The "on-time" is fixed. In the illustrated embodiment it is fixed at about 75 microseconds. As shown in FIG. 7, the closer together these pulses are, the brighter the light, i.e., the higher the power output HV. The actual frequency is determined by the windings in the core of transformer 18a and may be adjusted for maximum efficiency.

The actual sound source to which the above-described sound-to-light converter responds is widely optional. A "sound source" is considered to be any device that produces alternating or changing electric current and/or voltage in the audio frequency range. Usually this frequency range is 10 Hz to 20 KHz. Two representative examples are shown in FIG. 5. Input jack J1 provides a plug-jack type input for direct connection to a sound source. Another means of providing a sound source to the sound-to-light converter is through microphone M1.

As described above, the on-off switching signal for power transistors $Q_1$ and $Q_2$ is provided by burst oscillator 16b. As stated above, in the preferred embodiment, the pulse width is fixed at about 75 microseconds. The off time, or pulse repetition frequency (PRF), is programmable and/or variable depending on the voltage present at the positive input of voltage controlled pulse generator 16a, as shown in FIG. 5. The range of voltage controlled pulse generator 16a is from 0 volts present at its positive input (output low) causing zero power output to light source 22 and power drive circuit 18 to be off, to $+V_{dd}$ volts present at its positive input (output high) causing full power output to light source 22 and power drive circuit 18 to be on. Thus, the voltage present at the positive input of voltage controlled pulse generator 16a at any point in time determines the power output HV. This allows complete control of light source 22, e.g., the ionization process of a rare gas in a display tube. Thus, ionization is even over the entire length of the tube and, consequently, the tube emits light evenly over its entire length, from low power to full power.

A DC source voltage is necessary for primary windings $P_1$ and $P_2$ of transformer 18a in order to provide a current through power transistor $Q_1$ and primary $P_1$ and power transistor $Q_2$ and primary $P_2$, respectively. It is this primary current, together with the turns ratio of the primary windings, that determines the unloaded secondary output voltage HV. Thus, the DC input voltage to transformer primary windings $P_1$ and $P_2$ can be any voltage from 1.5 VDC to 400 VDC, the unloaded secondary output voltage being a function of the primary's and secondary's turns ratio.

The delay of the aforedescribed circuit is about 6 microseconds. Neon gas tubes have an on-time delay of between about 20 microseconds for short tubes to about 75 microseconds for longer tubes. The off-time delay of neon is negligible; that is, when the driving voltage is removed, ionization stops. Therefore, utilizing the technique of the present invention, the time between occurrence of an event, e.g., detection of a sound signal, and full brightness of an associated light source is less than 100 microseconds maximum. This is compared with 200 milliseconds for incandescent light systems—a 2000× improvement.

An alternative embodiment of a real time sound-to-light converter of the present invention provides for applications which require the sound-to-light converter to be operated from a low voltage DC power source such as, for example, in an automobile, or motor home or boat. With the following modifications, the 120 VAC sound-to-light converter described above in conjunction with the FIG. 5 embodiment can be made to satisfy all the requirements necessary to achieve the primary objective of the present invention, namely, a method for providing real time light response to an event, utilizing a low voltage DC source.

According to this low voltage embodiment of the invention, a power source of 12 volts DC replaces the 120 V AC power supply circuit in FIG. 5. Battery B1 in FIG. 5 represents such an alternative 12 volt DC power source.

Figure 8:
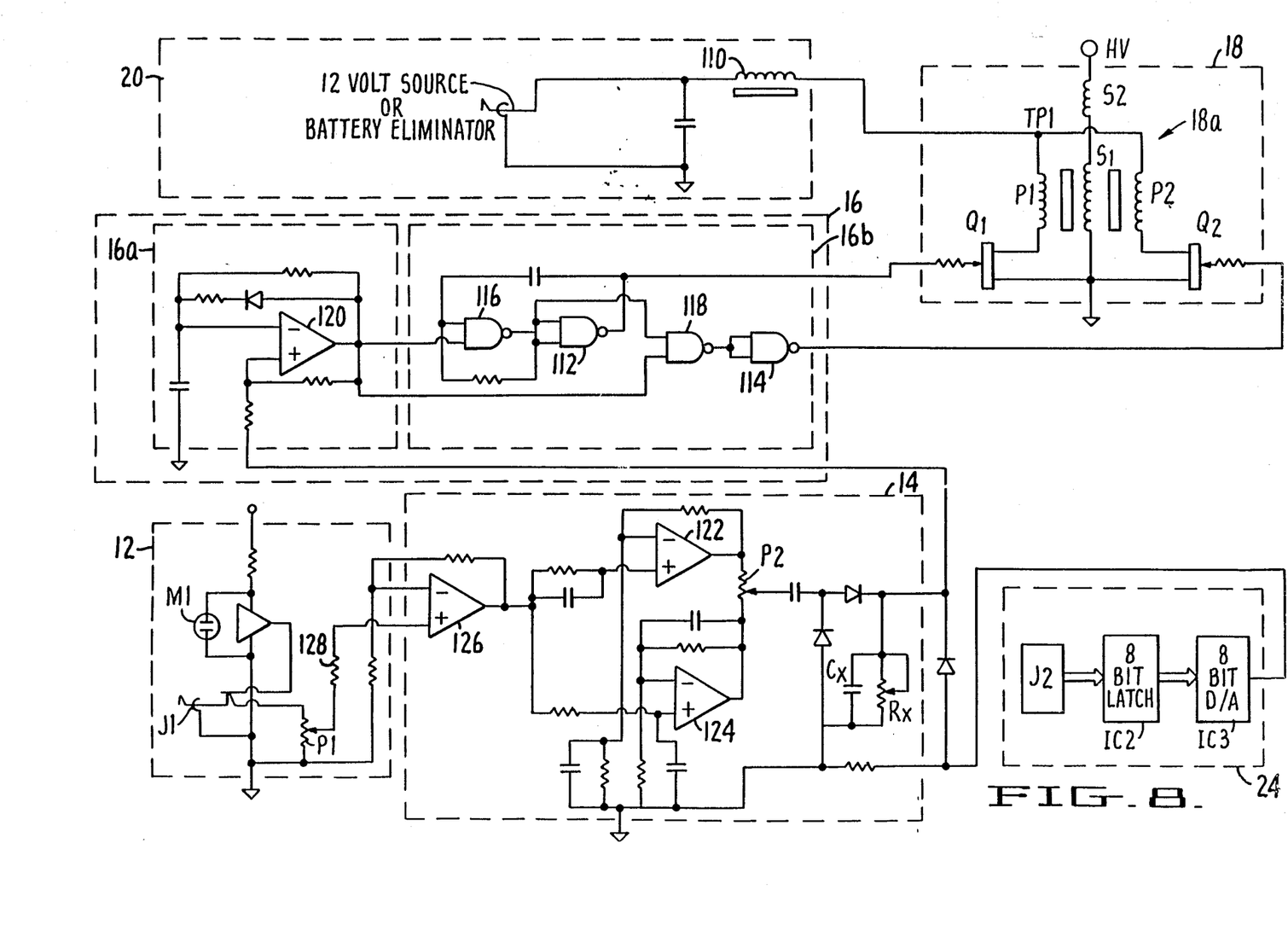
FIG. 8 is a schematic diagram illustrating a sound-to-light converter circuit according to the present invention which utilizes a 12 volt DC power supply.

Alternatively, referring to FIG. 8, the 12 volt DC power source may also be provided by a 12 volt battery eliminator. The only other difference between the 120 volt AC system shown in FIG. 5 and the 12 volt DC system shown in FIG. 8 is in the turns ratio of transformer 18a and in the elimination of the internally regulated 12 VDC voltage source, i.e., transformer T1 and the 12 volt source circuit shown in FIG. 5.

The majority of low power applications for the sound-to-light converter of the present invention require various source voltages to be accommodated with an appropriate corresponding turns ratio of the primaries and/or secondaries of transformer 18a. Therefore, in the preferred 12 volt DC system shown in FIG. 8, only the primary turns of transformer 18a are changed. The ratio for a 12 volts DC source is as follows: secondary turns are 5000 turns in series with 5000 turns, thus, the secondary is said to have 10,000 turns. Secondary output voltage of 15 KV unloaded with a primary voltage of 12 volts DC, ×2 based upon inductance, is 24 volts AC primary divided into 15,000 volts AC secondary providing a ratio of 625:1. 10,000 turns on the secondary divided by 625 is 16; thus, primaries P1 and P2 must have 16 turns each. The secondary windings remain the same as in the 120 VAC embodiment described above in conjunction with FIG. 5.

The actual turns ratio for a 12 volt DC system as described above and/or the 120 volt AC system shown in FIG. 5, or for that matter, any source voltage application, may vary depending on the requirements of light source 22. However, the circuit shown in FIG. 8, with the aforementioned modifications, will perform all the functions necessary to provide simultaneous sound-light stimuli.

Figure 9:
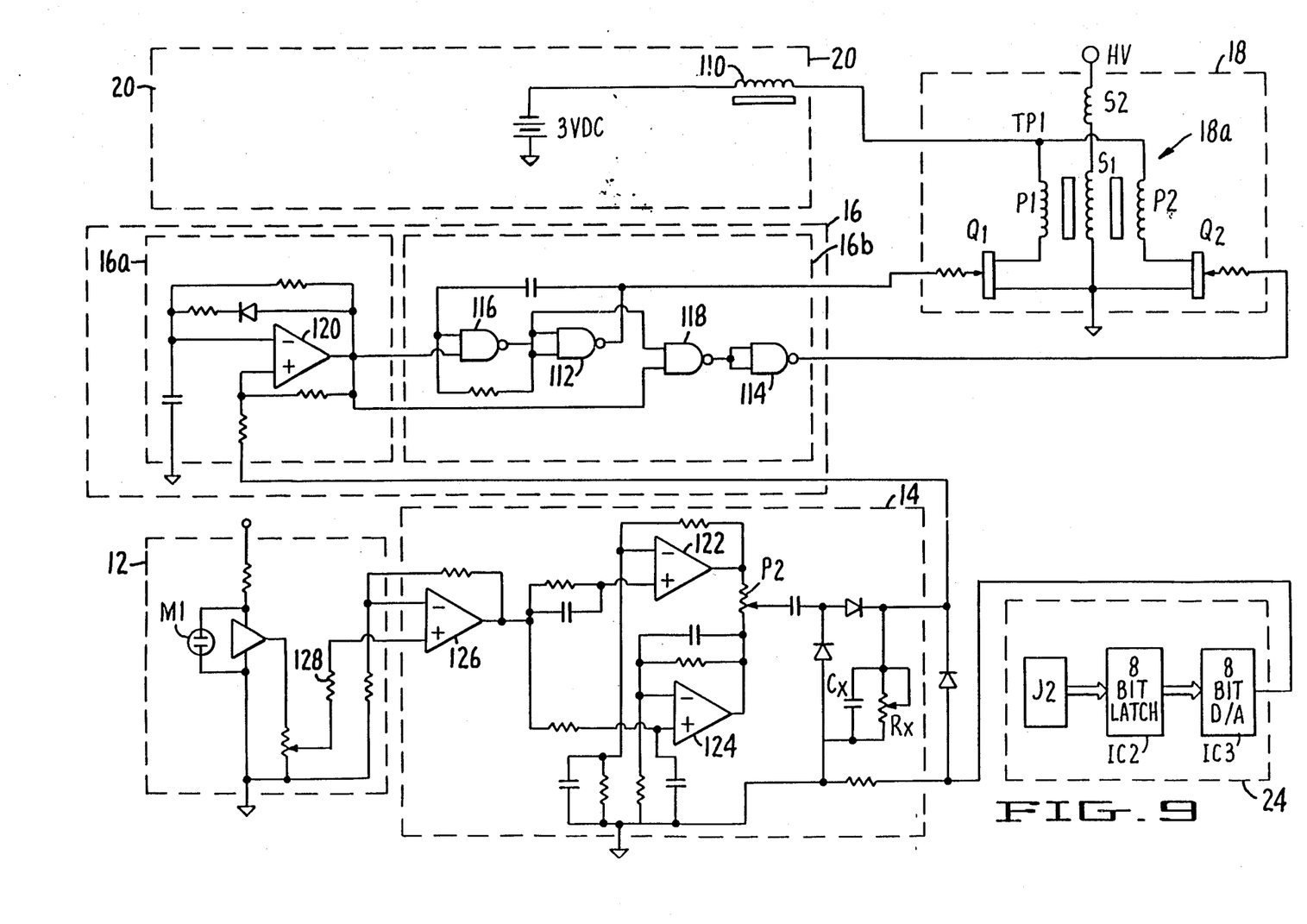
FIG. 9 is a schematic diagram illustrating a sound-to-light converter circuit according to the present invention which utilizes a 3 volt power supply.

A third alternative embodiment of the sound-to-light converter of the present invention, shown in FIG. 9, provides a 1.5–6 volt DC power supply for use in applications such as wearable neon jewelry or wearable light emitting diodes. In this embodiment, transformer 18a comprises a small core transformer having a turns ratio of about 1000:1. In this case, primary windings P1 and P2 have about five turns each and only one secondary is provided with about 5,000 turns. Thus, with about 3 volts DC connected to the input of inductor 110, as shown in FIG. 9, current is sourced for $P_1$, $Q_1$ and $P_2$, $Q_2$, respectively, in the "on" state. Thus, in the power "on" state, current through $P_1$ or $P_2$ causes inductance, thereby increasing the $P_1$ or $P_2$ AC voltage to about two times the source voltage. Thus, at a turns ratio of 1000:1 a primary voltage of 3 volts AC will have a secondary AC voltage unloaded of about 6 KV. However, again, the actual power output depends upon light source 22.

According to this miniaturized alternative embodiment, the core of transformer 18a is gapped. If a closed magnetic circuit is driven in only one direction, it magnetizes or "saturates" in that direction. The gap in the transformer core prevents saturation. Primary winding $P_1$, power transistor $Q_1$ and resistor R7 now function as the power drive circuit for the sound-to-light converter. This type of design is normally referred to as a "flyback" transformer design. It should be noted that the unique way that the secondaries are wound on the core, as described above, is still mandatory in high voltage applications, where the secondary windings exceed 4 or 5 thousand turns, in order to operate at the high frequencies necessary for those circuits to perform as a real time sound-to-light converters. However, in low voltage applications, such as that described with respect to FIG. 9, when the transformer core is small, i.e., less than about 3K turns, the frequency response time is sufficient and a dual secondary structure is not required. A gapped-core transformer structure, as described above, is used for cost reduction and in space saving applications.

The sound-to-light converter of the present invention may be used with any device that emits light energy. In particular, it may operate with any device and/or combination of devices that emit light as a wave motion of radiant energy which renders that environment visible.

The inherent high speed switching characteristics and fast response time of the sound-to-light converter of the present invention also allow for interfacing to a digital sound system and/or computer for special effects and the like.

Referring again to FIG. 5, a digital interface to the sound-to-light converter of the present invention is provided by digital control input J2. In the preferred embodiment, digital input J2 comprises an 8-bit word with clock and write bits. This external control circuit requires a positive true logic format, with the write input high while the clock input is high, in order to write into input port J2. The 8-bit word is then latched into latch IC-2 and remains stored until another word is written into the J2 port. D/A converter IC-3 converts the 8-bit word into an analog voltage. This analog voltage is proportional to the binary weights. That is, 0000 0000 binary or 00 hexidecimal written into the J2 port would have a binary weight of 00. Thus, the output of D/A convertor IC-3 is 0 volts and power output HV to light source 22 is 0. However, writing a 1111 1111 binary or FF hexidecimal into the J2 port would have a binary weight of 255. Thus, the output of D/A converter IC-3 is maximum (Vdd) and power output HV to light source 22 is maximum.

Any binary weight may be written into the J2 port as a word; 8-bit latch IC-2 will store it and converter IC-3 will output an analog voltage proportional to it. Thus, the binary weight of the 8-bit word written into the J2 port controls the actua output HV to light source 22. In a high speed operation, input port J2 may be written into and stored in less than 5 microseconds. The time delay between the write cycle and corresponding power output is less than 50 microseconds. Thus, the sound-to-light converter may be operated at, and respond to, digital input write cycle frequencies up to 20 KHz.

Figure 10:
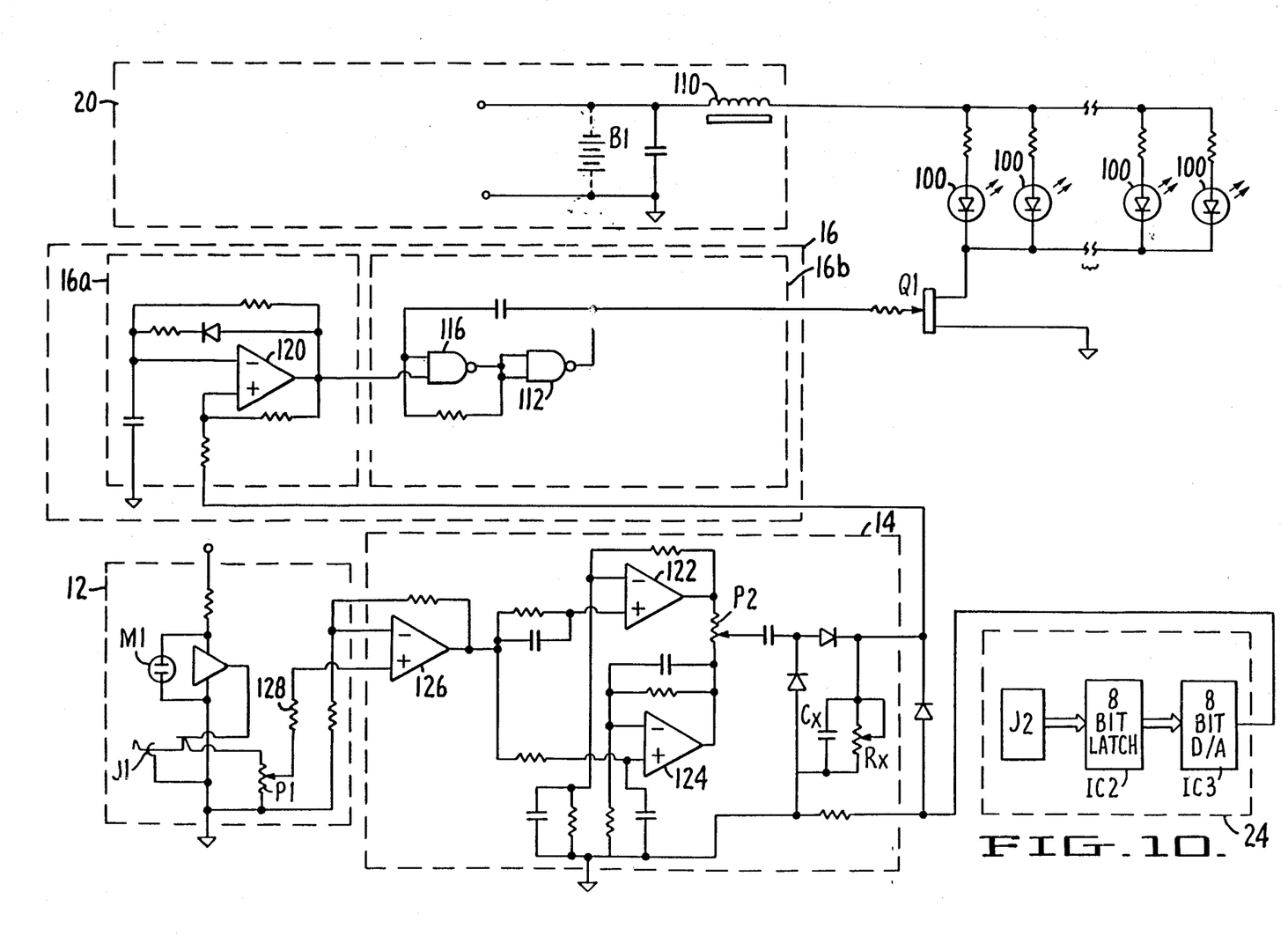
FIG. 10 is a schematic diagram illustrating a sound-to-light converter circuit according to the present invention which utilizes an LED display as a light source.

As shown in FIG. 10, light emitting diodes (LEDs) 100 may also be utilized as light source 22. In this embodiment, transformer 18a of FIG. 5 is replaced with LEDs 100 and resistors as shown. The LEDs 100 are driven by a single power transistor $Q_1$, obviating the need for alternating voltage bursts and thus the need for half of the circuitry of burst oscillator 16b of FIG. 5. The circuit shown in FIG. 10 will perform all functions required for simultaneous sound-light stimuli with LEDs as the light source.

In an enhanced version of the embodiments of the sound-to-light converter described above, dimming and/or background brightness control capability is provided.

Figure 11:
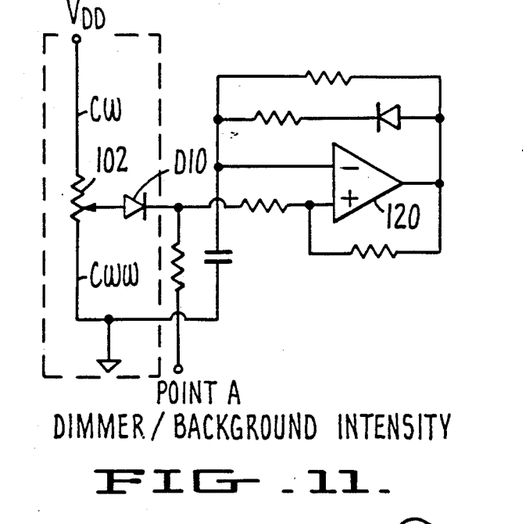
FIG. 11 is a schematic diagram illustrating circuitry which may be added to the embodiments of the invention shown in FIGS. 5, 8, 9 and 10 to provide dimming capability thereto.

Referring to FIG. 11, dimming capability is provided by placing potentiometer 102 in the FIG. 5 circuit as shown and connecting the wiper of potentiometer 102 to the positive input of op-amp 120 of voltage controlled pulse generator 16a. The high end (CW) of potentiometer 102 is connected to $V_{dd}$ and the low end (CCW) is connected to ground or common. This added circuitry operates as a dimmer, providing smooth control of power output HV to light source 22, thus controlling the light output intensity. The dimmer control also provides a background light output level for the sound-to-light converter. A positive going analog voltage overrides the voltage set by the background control and diode D10 becomes reversed biased until the analog voltage becomes low enough to forward bias diode D10, thus holding the power output to the level set by the background control, as shown in FIG. 11.

Figure 12:
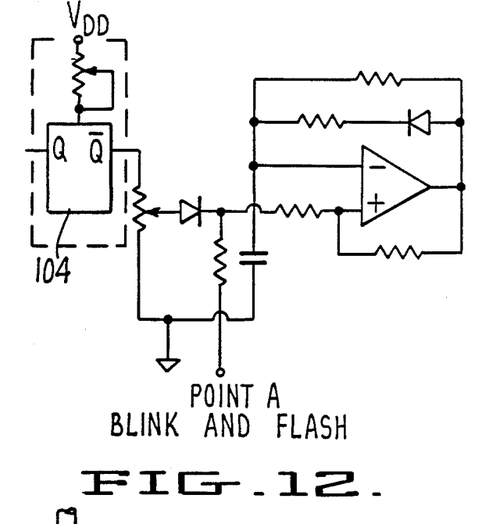
FIG. 12 is a schematic diagram illustrating circuitry which may be added to the embodiments of the invention shown in FIGS. 5, 8, 9 and 10 to provide blink and flash capability thereto.

A blinking feature may also be provided. As shown in FIG. 12, the blink or flash rate of the circuit shown in FIG. 5 may be adjusted by controlling the clock frequency of astable 104; astable 104 is disabled by switching its reset to common.

Figure 13:
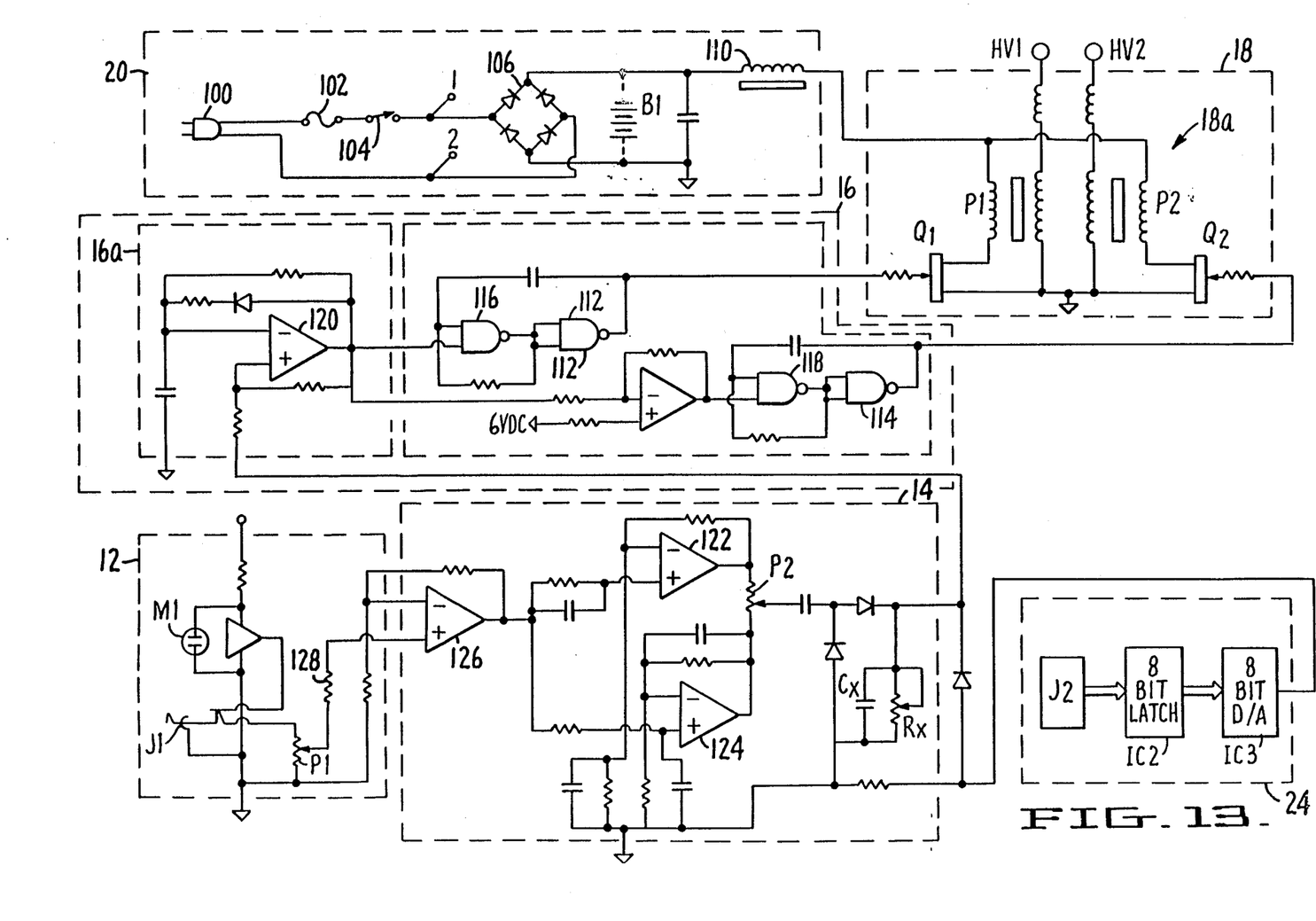
FIG. 13 is a schematic diagram illustrating a sound-to-light converter circuit according to the present invention which provides alternating, dual light sources.

A further alternative embodiment of a sound-to-light converter according to the present invention, shown in FIG. 13, incorporates two power output stages HV1 and HV2 common to one audio amplifier. One output is caused to be out of phase with the other, as illustrated in FIG. 13, by inverting the output of voltage controlled pulse generator 16a. Thus, the power output to light source HV2 is inversely proportional to the power output to light source HV1. One application of this embodiment is light animation, caused by sound waves, to give the appearance of motion synchronized in real time with the sound.

Figures 14A, 14B:
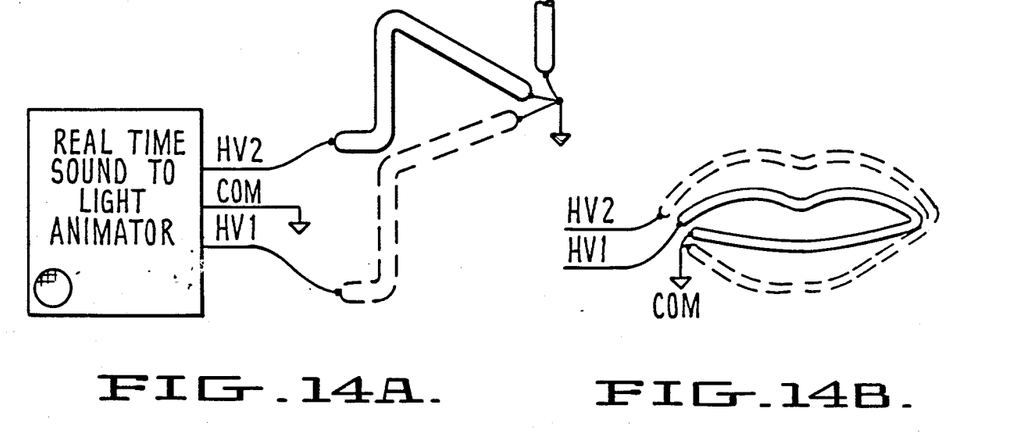
FIG. 14A is a schematic diagram illustrating an embodiment of the invention wherein the alternating dual light source circuit shown in FIG. 13 is utilized to provide "foot-stomping" animation capability.
FIG. 14B is a schematic diagram illustrating an embodiment of the invention wherein the alternating dual light source circuit shown in FIG. 13 is utilized to provide "lip-sync", animation.
Figure 15:
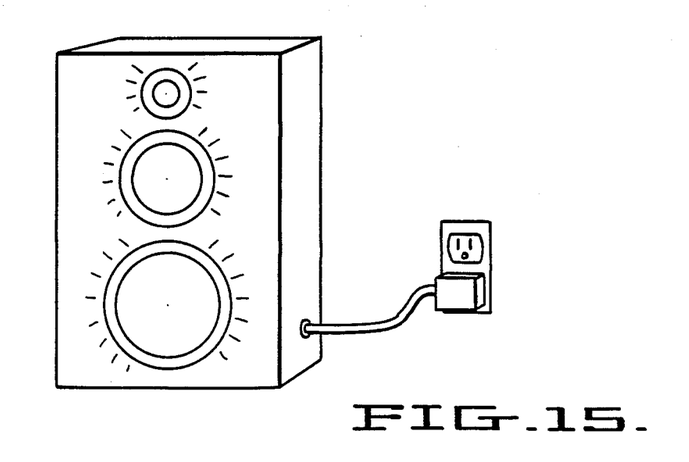
FIG. 15 is an illustration showing a sound-to-light converter according to the present invention utilized to provide a speaker enclosure.
Figure 16:
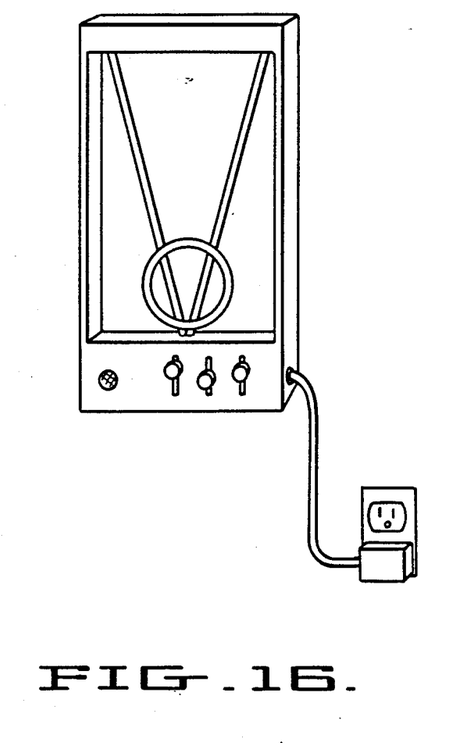
FIG. 16 is an illustration showing a sound-to-light converter according to the present invention utilized to provide a wall hanging.
Figure 17:
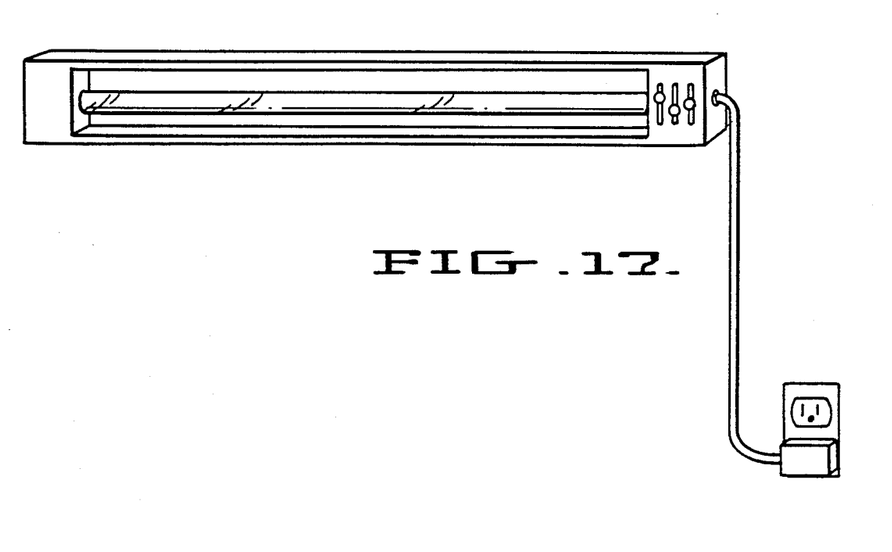
FIG. 17 is an illustration showing a sound-to-light converter according to the present invention utilized to provide a light strip.
Figure 18:
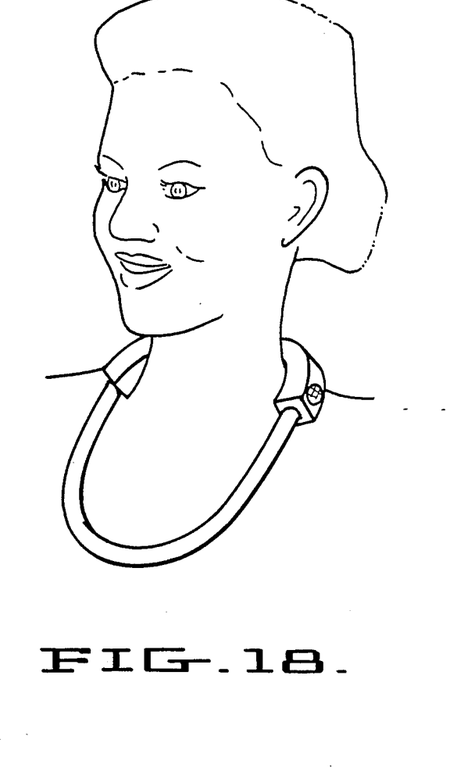
FIG. 18 is an illustration showing a sound-to-light converter according to the present invention utilized to provide wearable neon jewelry.

As an example, two sticks of neon could be provided, one powered by light source HV1, the other by light source HV2. The sound waves caused by a drum beat would give the appearance of the neon sticks moving in real time with the sound waves and/or drum beat. As shown in FIG. 14A, the neon sticks could also be configured as dancers legs, animated to give the appearance of "foot-stomping" in real time to the music. Alternatively, as shown in FIG. 14B, the neon could be configured to look like two sets of lips, one set open and the other set closed, with the lips appearing to open and close with the sound.

FIGS. 15–18 illustrate several other applications in which a sound-to-light converter according to the present invention might be used.

It should be understood that various alternatives to the structures described herein may be employed in practicing the present invention. It is intended that the following claims define the invention, and that the structure within the scope of these claims and their equivalents be covered thereby.

Figure 20:
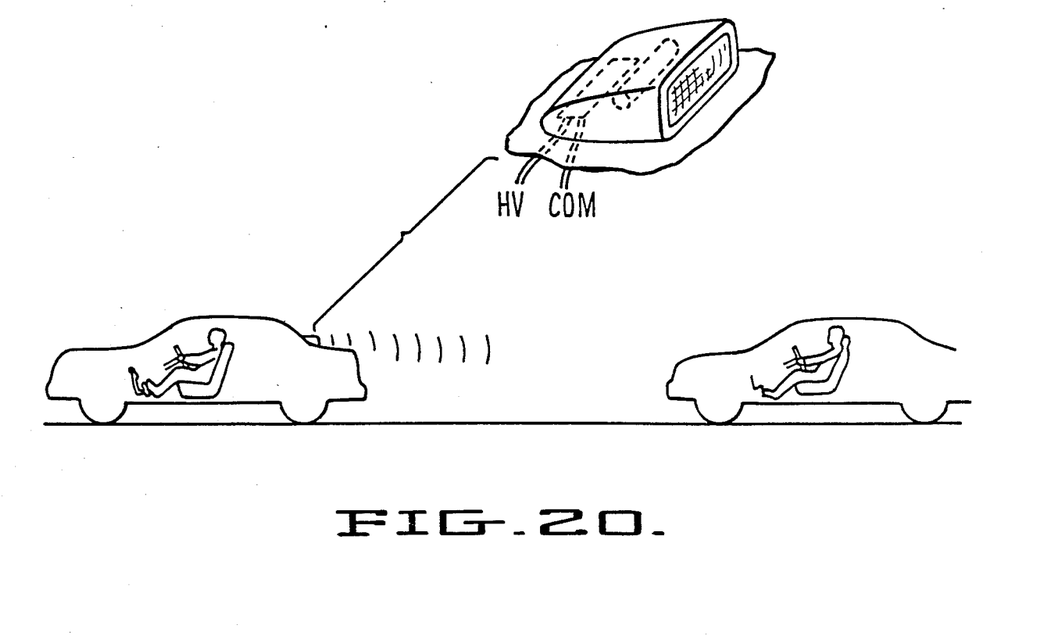
FIG. 20 is a schematic drawing illustrating utilization of the present invention to provide a brake light system.

For example, as stated above and as shown in FIG. 20, the invention set forth herein could find application in an automobile brake system. To implement this embodiment of the invention would, in fact, be quite simple. The 12 VDC embodiment illustrated in FIG. 8 could be mounted within the automobile at the rear window and connected to receive its standard 12 volt supply as the power drive input. Rather than utilizing the sound wave input to modulate the pulse generator, however, the positive input voltage to the pulse generator could be provided by the automobile's 12 volt supply as switched on and off by the brake pedal. Thus, application of the brake pedal would cause the voltage level of the pulse generator output to be maximum and the pulse width to be continuous. Thus, the power output to the rear window brake light, with a neon tube being preferable in this case, would be such that the brake light would go to full brightness in real time with the application of the brake pedal, resulting in the safety improvements discussed above.

What is claimed is:

1. A sound-to-light converter for converting a signal from a sound source to visible light energy in real time, the sound-to-light converter comprising:
    a light source;
    a power supply for illuminating the light source;
    means for monitoring the sound source signal comprising
    (a) a voltage controlled pulse generator which generates a pulsed output signal having a pulse repetition frequency corresponding to the intensity of the sound source signal; and
    (b) a burst oscillator which receives the pulsed output signal and generates first and second alternating voltage bursts in response thereto, the duty cycle of the alternating bursts corresponding to the pulse repetition frequency of the pulsed output signal; and
    a power driver connected between the power supply and the light source, the power driver being responsive to the first and second alternating voltage bursts to control the power provided to the light source by the power supply such that the intensity of light energy provided by the light source varies in real time with changes in the intensity of the sound source signal.

2. A sound-to-light converter as in claim 1 wherein the power driver comprises a transformer that includes
    a secondary winding connected between the light source and ground and comprising first and second secondary windings which are tied electrically in series and magnetically in parallel on the core of the transformer; and
    first and second primary windings, the first and second alternating voltage bursts being provided to the first and second primary windings, respectively.

3. A sound-to-light converter as in claim 2 wherein the first and second secondary windings contain the same number of turns.

4. A sound-to-light converter as in claim 1 wherein the sound source signal is a digital signal.

5. A sound-to-light converter as in claim 1 wherein the light source responds to changes in the amplitude of the sound signal within 100 microseconds after the occurrence of such changes.

6. A sound-to-light converter as in claim 1 wherein the light source comprises a rare gas.

7. A sound-to-light converter as in claim 6 wherein the rare gas comprises neon gas.

8. A sound-to-light converter as in claim 1 wherein the light source comprises a plurality of rare gases.

9. A sound-to-light converter as in claim 1 wherein the sound source signal is a sound wave.

10. A sound-to-light converter as in claim 1 wherein the power supply comprises a 120 VAC voltage source.

11. A sound-to-light converter as in claim 1 wherein the power supply comprises a 12 VDC voltage source.

12. A sound-to-light converter as in claim 1 wherein the power supply comprises a 1.5–6 VDC voltage source.

13. A sound-to-light converter as in claim 1 and further including means for dimming the intensity of light energy provided by the light source.

14. A sound-to-light converter as in claim 1 and further including means for causing the light source to blink.

15. A sound-to-light converter as in claim 1 wherein the light source comprises first and second lights and the power driver provides first and second power outputs to the first and second lights, respectively, the first power output being out of phase with the second power output such that first power output to the first light is inversely proportional to the second power output to the second light.

16. A sound-to-light converter as in claim 14 and further including means for adjusting the blink rate.

17. A sound-to-light converter for converting a signal from a sound source to visible light energy in real time, the sound-to-light converter comprising:
    a light source;
    a power supply for illuminating the light source;
    means for monitoring the sound source signal comprising
    (a) a pulse width modulator which generates a pulsed output signal having a pulse width corresponding to the intensity of the sound source signal; and
    (b) a burst oscillator which receives the pulsed output signal and generates first and second alternating signal and voltage bursts in response thereto, the duty cycle of the alternating bursts corresponding to the pulse width of the pulsed output signal; and
    a power driver connected between the power supply and the light source, the power driver being responsive to the first and second alternating voltage bursts to control the power provided to the light source by the power supply such that the intensity of light energy provided by the light source varies in real time with changes in the intensity of the sound source signal.

18. A sound-to-light converter as in claim 17 wherein the sound source signal is a sound wave.

19. A sound-to-light converter as in claim 17 wherein the sound source signal is a digital signal.

20. An apparatus for converting a digital signal to visible light energy in real time, comprising:
    a light source;
    a power supply for illuminating the light source; and
    means for monitoring the digital signal and for generating a pulsed electrical signal which varies in correspondence to changes in the digital signal such that the intensity of light energy provided by the light source varies in real time with changes in the digital signal wherein the means for monitoring and generating comprises a voltage controlled pulse generator which generates a pulsed output signal having a pulse repetition frequency corresponding to the changes in the digital signal;

a burst oscillator which receives he pulsed output signal and generate first and second alternating voltage bursts in response thereto, the duty cycle of the alternating bursts corresponding to the pulse repetition frequency of the pulsed output signal; and a power driver connected between the power supply and the light source, the power driver being responsive to the first and second alternating voltage bursts to control the power provided to the light source.

21. An apparatus for converting a digital signal to visible light energy in real time, comprising:

a light source;

a power supply for illuminating the light source; and means for monitoring the digital signal and for generating a pulsed electrical signal which varies in correspondence to changes in the digital signal such that the intensity of light energy provided by the light source varies in real time with changes in the digital signal wherein the means for monitoring comprises a pulse width modulator which generates a pulsed output signal having a pulse width corresponding to the changes in the digital signal;

a burst oscillator which receives the pulsed output signal and generates first and second alternating voltage bursts in response thereto, the duty cycle of the alternating bursts corresponding to the pulse width of the pulsed output signal; and a power driver connected between the power supply and the light source, the power drier being responsive to the first and second alternating voltage bursts to control the power provided to the light source by the power supply.

22. An apparatus as in claim 20 or 21 and further including means for dimming the intensity of light energy provided by the light source.

23. An apparatus as in claim 20 or 21 and further including means for causing the light source to blink.

24. An apparatus as in claim 23 and further including means for adjusting the blink rate.

25. A sound-to-light converter for converting sound waves to visible light energy in real time, the apparatus comprising;

a light source;

a receiver transducer which receives the sound waves and converts the sound waves into an electrical signal the voltage level of which corresponds to the amplitude of the sound signal;

an audio amplifier which amplifies the electrical signal;

pulse generating means which receives the amplified electrical signal and generates a pulsed output signal having a pulse repetition frequency which varies in correspondence to the voltage level of the amplified electrical signal;

a burst oscillator connected to receive the pulsed output signal from the pulse generating means and which generates first and second alternating voltage bursts in response thereto, the duty cycle of the first and second alternating voltage burst corresponding to the pulse repetition frequency of the pulsed output signal of the pulse generating means;

a power supply for providing power to the light source;

a power driver connected between the power supply and the light source and including a transformer comprising (i) a secondary winding connected between the light source and ground, the secondary winding comprising first and second secondary windings, the first and second secondary windings containing an equal number of turns and being electrically tied in series and magnetically tied in parallel on the core of the transformer;

(ii) first and second primary windings, one end of each of the first and second primary windings being commonly connected to the power supply;

(iii) a first switch connected between the other end of the first primary winding and ground;

(iv) a second switch connected between the other end of the second primary winding and ground;

the first and second alternating voltage bursts being provided to the first and second switches, respectively, such that the secondary winding provides power to the light source such that the intensity of light energy provided by the light source varies in real time with changes in the amplitude of the sound signal.

26. A sound-to-light converter as in claim 25 wherein the pulse generating means is a voltage controlled pulse generator.

27. A sound-to-light converter as in claim 25 wherein the pulse generating means is a pulse width modulator.

28. An apparatus for generating a real time light energy response to an event of changing magnitude, the apparatus comprising:

a light source;

a power supply for illuminating the light source;

means for monitoring the magnitude of the event comprising (a) a voltage controlled pulse generator which generates a pulsed output signal having a pulse repetition frequency corresponding to the magnitude of the event; and (b) means for generating voltage bursts in response to the pulsed output signal, the duty cycle of the voltage bursts corresponding to the pulse repetition frequency of the pulsed output signal; and a power driver connected between the power supply and the light source, the power driver being responsive to the voltage bursts to control the power provided to the light source by the power supply such that the intensity of light energy provided by the light source varies in real time with changes in the magnitude of the event.

29. An apparatus for generating a real time light energy response to an event of changing magnitude, the apparatus comprising:

a light source;

a power supply for illuminating the light source;

means for monitoring the magnitude of the event comprising (a) a pulse width modulator which generates a pulsed output signal having a pulse width corresponding to the magnitude of the event; and (b) means for generating voltage bursts in response to the pulsed output signal, the duty cycle of the voltage bursts corresponding to the pulse width of the pulsed output signal; and a power driver connected between the power supply and the light source, the power driver being responsive to the voltage bursts to control the power provided to the light source by the power supply such that the intensity of light energy provided by the light source varies in real time with changes in the magnitude of the event.

30. An apparatus as in claim 28 or 29 wherein the event comprises a digital input signal to the apparatus.

31. An apparatus as in claim 30 wherein the digital input signal is an audio signal.

32. An apparatus as in claim 28 or 29 wherein the event comprises sound waves generated by a sound source.

33. An apparatus as in claim 28 or 29 wherein the power driver comprises a fly-back transformer.

34. A driver for controlling the power provided by a power supply to a light source so as to provide a real time light energy response to an event of changing magnitude, the driver comprising:
 (a) means responsive to changes in the magnitude of the event for generating a pulsed output signal having a pulse repetition frequency corresponding to the magnitude of the event;
 (b) means for generating voltage bursts in response to the pulsed output signal, the duty cycle of the voltage bursts corresponding to the pulse repetition frequency of the pulsed output signal; and
 (c) transformer means connectable between the power supply and the light source, the transformer means being responsive to the voltage bursts to control the power provided to the light source such that the intensity of light provided by the light source varies within 100 microseconds of corresponding changes in the magnitude of the event.

35. A driver for controlling the power provided by a power supply to a light source so as to provide a real time light energy response to an event of changing magnitude, the apparatus comprising:
 (a) means responsive to changes in the magnitude of the event for generating a pulsed output signal having a pulse width corresponding to the magnitude of the event;
 (b) means for generating voltage bursts in response to the pulsed output signal, the duty cycle of the voltage bursts corresponding to the pulse width of the pulsed output signal; and
 (c) transformer means connectable between the power supply and the light source, the transformer means being responsive to the voltage bursts to control the power provided to the light source such that the intensity of light provided by the light source varies within 100 microseconds of corresponding changes in the magnitude of the event.

36. A driver for controlling the power provided by a power supply to a light source so as to provide a real time light energy response to an event of changing magnitude, the driver comprising:
 (a) voltage controlled pulse generator means responsive to changes in the magnitude of the event for generating a pulsed output signal having a pulse repetition frequency corresponding to the magnitude of the event;
 (b) a burst oscillator which receives the pulsed output signal and generates first and second alternating voltage bursts in response thereto, the duty cycle of the alternating voltage bursts corresponding to the pulse repetition frequency of the pulsed output signal; and
 (c) a transformer connected between the power supply and the light source, the transformer being responsive to the first and second alternating voltage bursts to control the power provided by the power supply such that the intensity of light energy provided by the light source varies within 100 microseconds of corresponding changes in the magnitude of the event.

37. A driver for controlling the power provided by a power supply to a light source so as to provide a real time light energy response to an event to changing magnitude, the driver comprising:
 (a) pulse width modulator means responsive to changes in the magnitude of the event for generating a pulsed output signal having a pulse width corresponding to the magnitude of the event;
 (b) a burst oscillator which receives the pulsed output signal and generates first and second alternating voltage bursts in response thereto, the duty cycle of the alternating bursts corresponding to the pulse width of the pulsed output signal; and
 (c) a transformer connectable between the power supply and the light source, the transformer being responsive to the first and second alternating voltage bursts to control the power provided to the light source by the power supply such that the intensity of light energy provided by the light source varies within 100 microseconds of corresponding changes in the magnitude of the event.

38. A driver as in claim 36 or 37 wherein the transformer comprises
 a secondary winding connectable between the light source and ground and comprising first and second secondary windings which are tied electrically in series and magnetically in parallel on the core of the transformer; and
 first and second primary windings, the first and second alternating voltage bursts being provided to the first and second primary windings, respectively.

* * * * *